(12) United States Patent
Sanders et al.

(10) Patent No.: US 11,761,369 B1
(45) Date of Patent: Sep. 19, 2023

(54) HEAT PIPES INTEGRATED INTO A 3-D PRINTED PART

(71) Applicant: Government of the United States, as represented by the Secretary of the Air Force, Wright-Patterson AFB, OH (US)

(72) Inventors: Mitchell Sanders, Dayton, OH (US); Gregory Minkiewicz, Springfield, OH (US)

(73) Assignee: United States of America as represented by the Secretary of the Air Force, Wright-Patterson AFB, OH (US)

(*) Notice: Subject to any disclaimer, the term of this patent is extended or adjusted under 35 U.S.C. 154(b) by 0 days.

(21) Appl. No.: 17/964,093

(22) Filed: Oct. 12, 2022

Related U.S. Application Data

(60) Provisional application No. 63/274,107, filed on Nov. 1, 2021.

(51) Int. Cl.
| | | |
|---|---|---|
| *F01P 3/22* | (2006.01) | |
| *F02F 1/06* | (2006.01) | |
| *B33Y 80/00* | (2015.01) | |
| *F01P 3/02* | (2006.01) | |

(52) U.S. Cl.
CPC ............ *F01P 3/22* (2013.01); *F02F 1/065* (2013.01); *B33Y 80/00* (2014.12); *F01P 2003/022* (2013.01); *F01P 2003/2278* (2013.01)

(58) Field of Classification Search
CPC .......... F01P 3/22; F01P 2003/022; F01P 2003/2278; F02F 1/065; B33Y 80/00
See application file for complete search history.

(56) References Cited

U.S. PATENT DOCUMENTS

| 9,901,008 B2 | 2/2018 | Shedd et al. |
|---|---|---|
| 2015/0237762 A1 | 8/2015 | Holt et al. |

FOREIGN PATENT DOCUMENTS

| WO | WO-9522686 A1 * | 8/1995 | ............ F01P 3/06 |
|---|---|---|---|
| WO | WO-2019137711 A1 * | 7/2019 | |

\* cited by examiner

*Primary Examiner* — Jacob M Amick
*Assistant Examiner* — Charles J Brauch
(74) *Attorney, Agent, or Firm* — AFMCLO/JAZ; Matthew D. Fair

(57) ABSTRACT

An air cooled machine is formed with a housing and a plurality of heat rejecting fins with a heat pipe system disposed therein. The heat pipe system includes a primary passageway and a plurality of leg passageways extending through the housing and into each fin. A working fluid is disposed within the heat pipe system and is operable to receive heat from a heat source, change material phase at a threshold temperature and transfer the heat through the fins to a surrounding atmosphere.

19 Claims, 1 Drawing Sheet

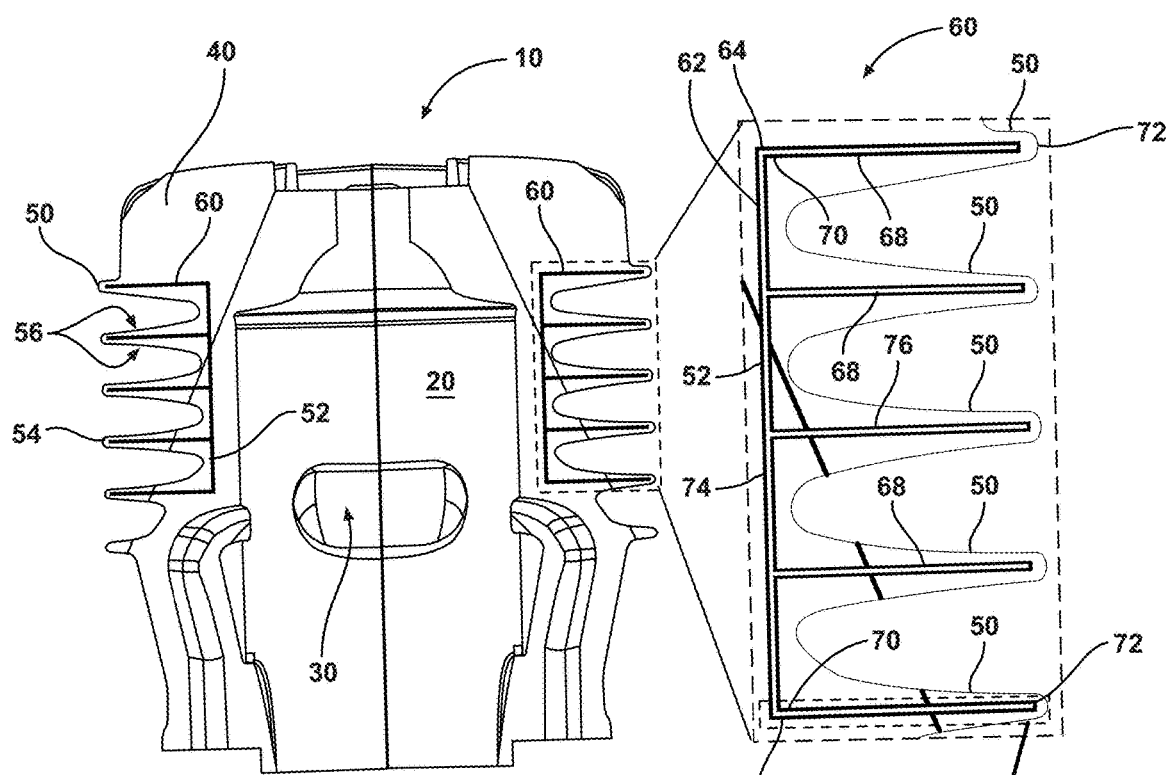
FIG. 1
FIG. 2
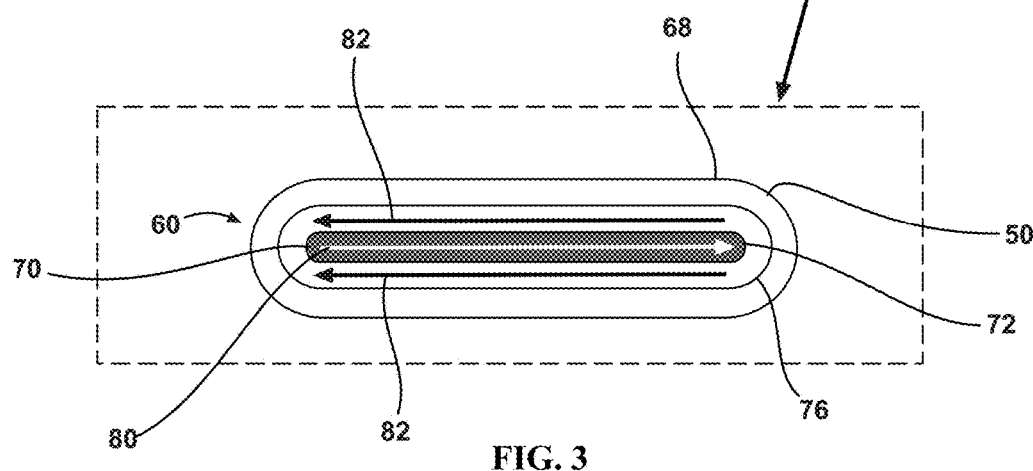
FIG. 3

HEAT PIPES INTEGRATED INTO A 3-D PRINTED PART

Pursuant to 37 C.F.R. § 1.78(a)(4), this application claims the benefit of and priority to prior filed Provisional Application Ser. No. 63/274,107, filed Nov. 1, 2021, which is expressly incorporated herein by reference.

RIGHTS OF THE GOVERNMENT

The invention described herein may be manufactured and used by or for the Government of the United States for all governmental purposes without the payment of any royalty.

TECHNICAL FIELD

The present disclosure generally relates to the use of heat pipes to increase heat transfer in an air-cooled device and more particularly, but not exclusively to heat pipes that are integrated into a 3-D printed air-cooled cylinder of an internal combustion engine.

BACKGROUND

Heat pipes utilize the phase change properties of a working fluid to transport heat rapidly. The phase change of the working fluid can include transforming the working fluid from a solid phase to a liquid phase and/or to a gas phase as heat is transferred from a hot component to the working fluid. Heat pipe systems increase heat transfer rates from a component by transporting the working fluid through internal passageways via capillary action from a relatively hotter region to a relatively cooler region of the component. A portion of the heat is then conducted way from the component via convection heat transfer and/or radiation heat transfer to the surrounding atmosphere. Air-cooled engines used in applications such as flying drones can increase power output when the cooling capacity of the engine is increased. There remains a need to improve heat transfer means in air cooled engines, accordingly, further contributions in this area of technology is described in this disclosure.

SUMMARY

One embodiment of the present disclosure includes a unique cooling system for an air-cooled engine. Other embodiments include apparatuses, systems, devices, hardware, methods, and combinations wherein a heat pipe system is used to increase heat transfer from the air-cooled engine. Further embodiments, forms, features, aspects, benefits, and advantages of the present application shall become apparent from the description and figures provided herewith.

BRIEF DESCRIPTION OF THE FIGURES

FIG. 1 is a cross sectional view of an air cooled engine cylinder according to one embodiment of the present disclosure;

FIG. 2 is a view of a heat pipe system formed in cooling fins for the air cooled engine of FIG. 1; and FIG. 3 is schematic view of portion of the heat pipe of FIG. 2. Illustrating working fluid flow movement.

DETAILED DESCRIPTION OF THE ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

The present disclosure is directed to a cooling method and means for use in air-cooled engines or electric motors and the like. The cooling means provides increased cooling capacity with a relatively few low cost modifications. Increasing engine cooling capacity helps to minimize excessive engine component wear, extends lubrication life and facilitates increased horsepower output without a corresponding increase in weight penalties. In one non-limiting embodiment, this cooling technology can be implemented into unmanned aerial vehicles (UAV's) to increase flight speed and flight time without resorting to a relatively heavy and high cost pump driven liquid cooling system.

Heat pipes can be used to effectively remove heat from an engine cylinder to one or more cooling fins by using phase change properties of a working fluid to transfer heat more effectively than simply by convection and conduction means. The heat pipe system disperses heat evenly over the surface of the cooling fins, thus heat can be rejected from the system at a higher rate.

Air-cooled motors are typically used in UAV applications because the cooling system has no moving parts and require little to no maintenance. However, in practice, the downside to using air cooled engines is that they typically have durability problems due to their marginal cooling capability. Excess heat causes thermal breakdown of the lubricant, which in turn causes reduction in useful life of the engine. Air-cooling systems are limited by the thermal conductivity of the material used for the cooling fins and the surface area of the cooling fin. Heat pipes integrated into the cooling fins and cylinder wall causes the thermal conductivity of the material to be increased by tens to thousands of times to that of the base material. By increasing the thermal conductivity of the material, the amount of heat that can be rejected by the system is greatly increased.

A heat pipe works by using the phase change properties of a working fluid to move heat through a system quickly. The working fluid used in the heat pipe system is determined by the operating conditions of the engine. In some forms, the working fluid is a liquid at room temperature and will phase change to a gas at operating temperatures. In other forms, the working fluid may be a solid or partially solid at room temperature such as wax based material or the like. The working fluid can be selected such that its phase change temperature can be tailored to fit the application by modifying the pressure of the system as one skilled in the art would readily understand. By way of example and not limitation, the working fluid can include helium, hydrogen, neon, oxygen, nitrogen, ethane, propylene, pentane, methanol, toluene, ammonia, water, naphthalene, cesium, potassium, sodium and combinations thereof.

When the temperature in one region of the heat pipe begins to increase above the working phase change temperature, the fluid inside the heat pipe will change phases from a liquid to a gas (or solid to liquid in some cases). The hot gas will then move away from the hot region of the motor and will condense on the cooler surfaces which in the disclosed embodiment are cooling fins. The heat that was stored in the gas will then be transferred to the cool surface and will then be rejected to the air passing over the outer surface of the cooling fin.

The condensed fluid will then move back to the hot region though a wick structure that lines the inside of the heat pipe so that the cycle can be repeated. The wick structure moves the liquid using either gravity or capillary action depending on the application. The wick structure can be created by one or more of several forms including a sintered metal, a plurality of grooves cut into the wall of the flow path, a honey comb like structure as well as others known to those skilled in the art.

The heat pipes can be integrated into the cylinder head by manufacturing with additive manufacturing processes. The material will be built up in a way that will produce hollow regions in the fins and a cylinder jacket. Hollow tubes in the fins will branch into the cylinder jacket. The heat from the combustion in the cylinder will evaporate a portion of the working fluid near the hottest region. The hot gasses will then move from the cylinder jacket, into the cooling fin passages. While in the cooling fin, the gas will cool down enough to condense on the surface of the wall. The cooled fluid will then return to the cylinder jacket through gravity or capillary action.

The working fluid of the heat pipes can be added to the motor after the additive manufacturing process has been completed. After the pipes are filled with a working fluid they should not require any maintenance, and will continue to work indefinitely as long as the working fluid remains in the pipe.

It should be understood that this cooling concept can be used in other applications such as with the trochoid of a Wankel rotary motor and the like. This cooling method causes the temperature to average out through each flank of the inner trochoid. By having a more even and consistent temperature over the entire surface, the tolerances of the seals in the motor can be tightened and thus reduce losses and increase efficiency. Furthermore the durability and combustion consistency of the motor and will be increased. The cooling method for a rotary engine can include a working fluid that would be in solid form at room temperature and transformed to a liquid at a working temperature. The hot liquid working fluid moves away from the walls of the combustion chamber and the cooler solids is forced toward the outer combustion walls due to the centrifugal forces generated in the rotating trochoid.

Referring to FIG. 1, a cross sectional view of a portion of an air cooled engine 10 having a heat pipe system 60 operable to increase heat transfer from the engine 10. While the engine 10 is a simplified schematic view of a single cylinder, it should be understood that the heat pipe system 60 disclosed herein, can be used with other air cooled engine configurations, including but not limited to multi-cylinder engines.

The engine 10 includes a cylinder 20 with an exhaust port 30 operable with an internal piston (not shown) as one skilled in the art would readily understand. A cylinder head 40 can include one or more cooling fins 50 projecting away therefrom. The cooling fins 50 extend from a base 52 connected to the cylinder head 40 to a distal tip 54. The cooling fins 50 have an outer wall 56 that defines a width or thickness designed to permit portions of the heat pipe system 60 to be formed therein.

Referring now to FIG. 2, an enlarged view of a portion of the heat pipe system 60 is illustrated. The heat pipe system 60 includes a primary passageway 62 that extends between a first end 64 and a second end 66 along the base 52 of the cylinder head 40. At least one leg 68 extends from a first end 70 to a second end 72 through each of the cooling fins 50. Each leg 68 is connected to the primary passageway 62. The primary passageway 62 includes a cavity 74 wherein a working fluid is disposed. Each of the legs 68 include a cavity 76 positioned therein. The primary cavity 74 is in fluid communication with each of the cavities 76 located in the legs 68 of the heat pipe system 60. The working fluid absorbs heat from the engine 10 and conducts the heat through the cavities 74, 76 to the distal ends 72 of the legs 68 as described above. Heat rejected by the engine 10 is transferred from the working fluid through conduction heat transfer to the cooling fins 50 and then through convection heat transfer means to the ambient surroundings.

Referring now to FIG. 3, a schematic representation of heat movement in the working fluid through a representative leg 68 of the heat pipe system 60. The leg 68 extends from a relative hotter region at a first end 70 to a relative cooler region at a second end 72. The working fluid changes material phase to a gas and moves in the direction of arrow 80 through capillary action from the first end 70 to the second end 72. Heat is rejected through the fin 50 with the maximum heat transfer occurring proximate the cooler region at the second end 72. The working fluid changes material phase back to a liquid and then moves back to the hotter region as represented by arrows 82 so that the heat rejection process is a continuous operation. While not shown in this schematic view, the leg 68 is fluidly connected to the primary passageway 62 (see FIG. 2) which in turn fluidly connects to each of the plurality of legs 68 so that the working fluid and heat transfer can remove heat from the hottest regions of the engine in the most efficient manner.

In some forms, a machine and the working fluid pathways therein may be formed contemporaneously through additive manufacturing processes. By way of example and not limitation, a 3D printer may print the machine layer by layer and may include a plurality of different materials such as by way of example and not limitation, metals, metal alloys, plastics, composites, ceramics and combinations thereof. It should be understood that the present invention may also be manufactured with traditional methods such as forging and machining with milling and drilling processes.

In one aspect the present application includes an air cooled machine comprising: a housing; a heat source positioned within the housing; a plurality of heat rejecting fins projecting outward from the housing; a heat pipe system having a primary passageway and a plurality of legs extending therefrom; a working fluid disposed within the heat pipe system; and wherein the working fluid receives heat from the housing and rejects the heat through the fins to a surrounding atmosphere.

In refining aspects, the working fluid changes material phase after reaching a threshold temperature; the heat pipe system includes a closed loop passageway connecting the primary passageway with the plurality of legs; the primary passageway of the heat pipe system extends along a longitudinal length of the housing; the legs of the heat pipe system extend from the primary passageway into each of the fins; wherein the legs extend from a first end to a second end of each fin; wherein the working fluid transfers heat from the primary passageway to the legs of the heat pipe system; wherein the working fluid is a solid, liquid or gas depending on the operating temperature; wherein the working fluid is one of helium, hydrogen, neon, oxygen, nitrogen, ethane, propylene, pentane, methanol, toluene, ammonia, water, naphthalene, cesium, potassium and/or sodium; wherein the housing, fins, primary passageway and legs are formed contemporaneously during an additive manufacturing process; and wherein the additive manufacturing process is performed by a 3D printer.

In another aspect, the present application includes an internal combustion engine comprising: a housing having a cylinder and a piston operable therein; a plurality of cooling fins projecting away from the housing; and a working fluid passageway formed in the housing and at least one of the cooling fins.

In refining aspects, the working fluid is one of a solid or liquid at room temperature; wherein the working fluid transforms into a liquid or gas above a threshold operating temperature; wherein the working fluid passageway is formed contemporaneously with the housing and the fins with an additive manufacturing process; wherein the working fluid passageway includes a primary passageway formed in the housing that is in fluid communication with at least one leg passageway formed in at least one of the fins; and wherein the working fluid transfers heat from the housing to the fins prior to radiating heat into a surrounding atmosphere.

In another aspect, the present application includes a method comprising: generating heat in a machine; transferring heat to a working fluid in a passageway formed in the machine; changing a phase of the working fluid at a threshold operating temperature; moving heat via flow of the working fluid into a fin extending from the machine; and transferring heat from the fin to a surrounding atmosphere.

In refining aspects, the method further comprises forming the working fluid passageway contemporaneously with the housing of the machine; and wherein the forming includes using a 3D printer to print machine structure and working fluid passageways contemporaneously.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. An air cooled machine comprising:
   a housing;
   a heat source positioned within the housing;
   a plurality of heat rejecting fins projecting outward from the housing;
   a heat pipe system having a primary passageway and a plurality of legs extending therefrom;
   a working fluid disposed within the heat pipe system;
   wherein the working fluid transfers heat from the primary passageway to the legs of the heat pipe system; and
   wherein the working fluid receives heat from the housing and rejects the heat through the fins to a surrounding atmosphere.

2. The air cooled machine of claim 1, wherein the working fluid changes material phase after reaching a threshold temperature.

3. The air cooled machine claim 1, wherein the heat pipe system includes a closed loop passageway connecting the primary passageway with the plurality of legs.

4. The air cooled machine of claim 1, wherein the primary passageway of the heat pipe system extends along a longitudinal length of the housing.

5. The air cooled machine of claim 4, wherein the legs of the heat pipe system extend from the primary passageway into each of the fins.

6. The air cooled machine of claim 5, wherein the legs extend from a first end to a second end of each fin.

7. The air cooled machine claim 1, wherein the working fluid is a solid, liquid or gas depending on the operating temperature.

8. The air cooled machine of claim 1, wherein the working fluid is one of helium, hydrogen, neon, oxygen, nitrogen, ethane, propylene, pentane, methanol, toluene, ammonia, water, naphthalene, cesium, potassium and/or sodium.

9. The air cooled machine claim 1, wherein the housing, fins, primary passageway and legs are formed contemporaneously during an additive manufacturing process.

10. The air cooled machine claim 9, wherein the additive manufacturing process is performed by a 3D printer.

11. An internal combustion engine comprising:
    a housing having a cylinder and a piston operable therein;
    a plurality of cooling fins projecting away from the housing; and
    a primary working fluid passageway formed in the housing having a leg that extends into at least one of the plurality of cooling fins.

12. The internal combustion engine of claim 11, wherein the working fluid is one of a solid or liquid at room temperature.

13. The internal combustion engine of claim 12, wherein the working fluid transforms into a liquid or gas above a threshold operating temperature.

14. The internal combustion engine of claim 11, wherein the working fluid passageway is formed contemporaneously with the housing and the fins with an additive manufacturing process.

15. The internal combustion engine of claim 11, wherein the working fluid passageway includes a primary passageway formed in the housing that is in fluid communication with at least one leg passageway formed in at least one of the fins.

16. The internal combustion engine of claim 11, wherein the working fluid transfers heat from the housing to the fins prior to radiating heat into a surrounding atmosphere.

17. A method comprising:
    generating heat in a machine;
    transferring heat to a working fluid in a passageway formed in the machine;
    changing a phase of the working fluid at a threshold operating temperature;

moving heat via flow of the working fluid from a primary passageway formed in a cylinder head into a leg passageway formed in a fin extending from the machine; and transferring heat from the fin directly to a surrounding atmosphere.

18. The method of claim 17, further comprising forming the working fluid passageway contemporaneously with the housing of the machine.

19. The method of claim 18, wherein the forming includes using a 3D printer to print machine structure and working fluid passageways contemporaneously.

* * * * *